May 1, 1934.  B. G. JONES  1,956,765
APPARATUS FOR PRODUCING HIGH VACUUM
Filed March 25, 1930  2 Sheets-Sheet 1
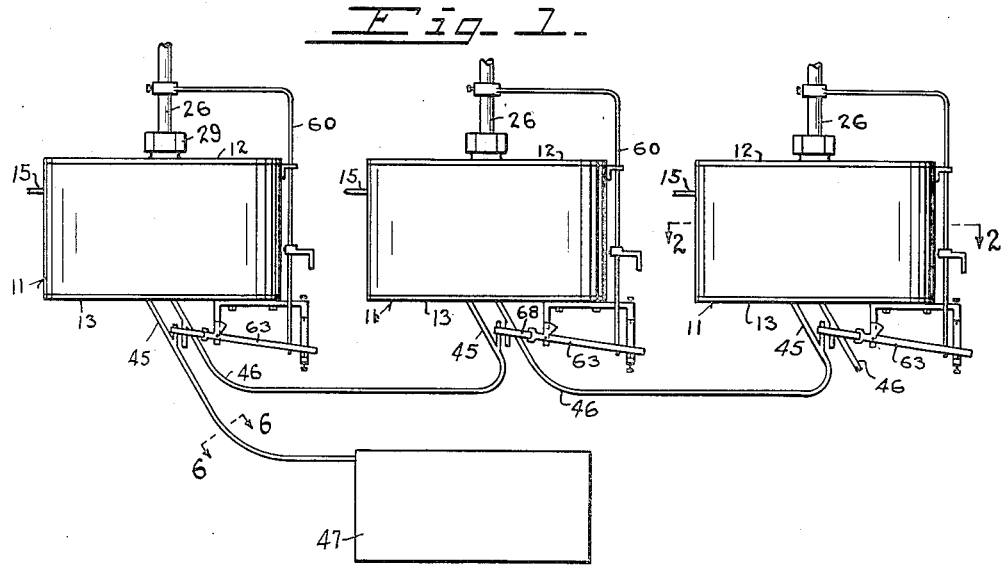
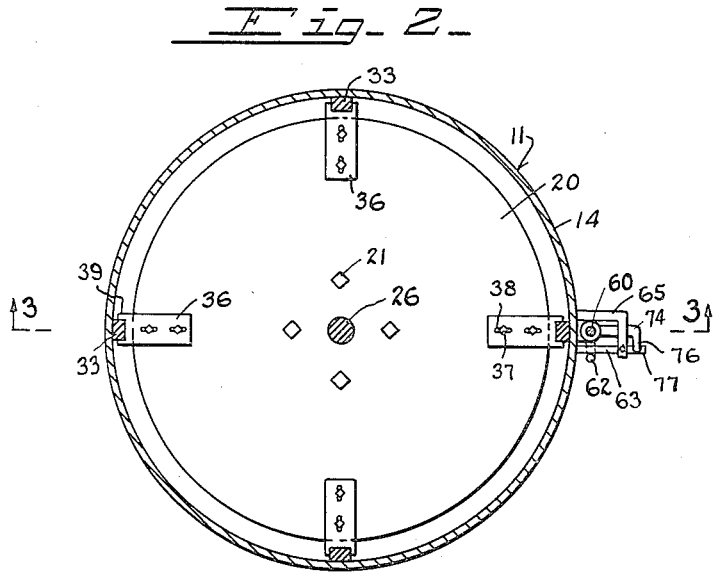
INVENTOR.
BONNIE G. JONES.
BY
*W. C. Karel.*
ATTORNEY.

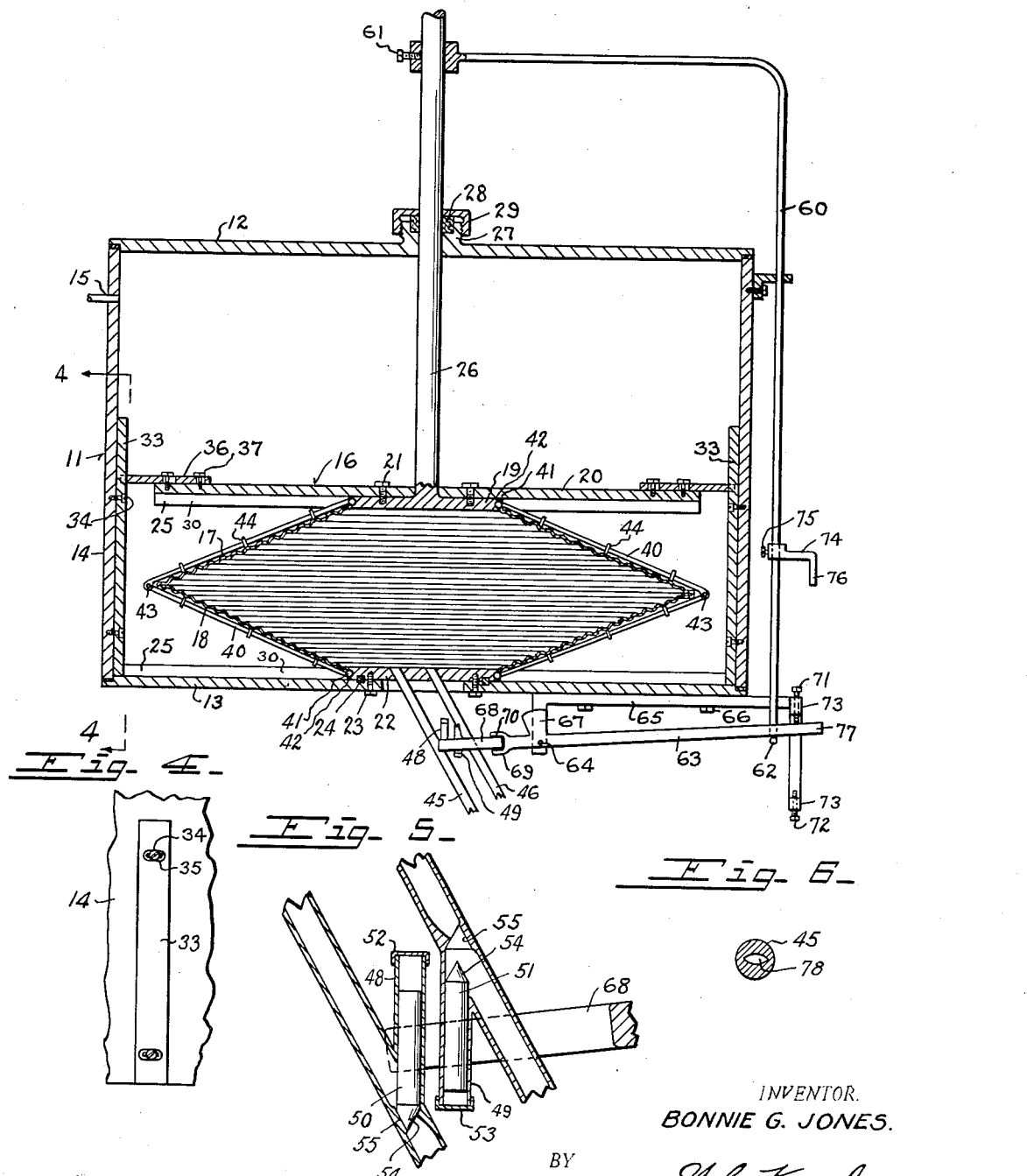

Patented May 1, 1934

1,956,765

UNITED STATES PATENT OFFICE 1,956,765

APPARATUS FOR PRODUCING HIGH VACUUM

Bonnie G. Jones, Cincinnati, Ohio

Application March 25, 1930, Serial No. 438,915

8 Claims. (Cl. 230—160)

My invention relates to improved means and method of obtaining higher vacuum than has heretofore been possible.

The object of my invention is to produce a novel method of evacuating a given receptacle to a far higher vacuum than has heretofore been possible. Further objects reside in the novel means employed to obtain the higher vacuum.

The invention will be further readily understood from the following description and claims, and from the drawings in which latter:

Fig. 1 is a side elevation in diagrammatic form, showing the application of the invention.

Fig. 2 is a horizontal cross section of one of the evacuating devices, taken in the plane of the line 2—2 of Fig. 1.

Fig. 3 is an axial section of the same taken on the line 3—3 of Fig. 2.

Fig. 4 is a detail section of the guiding means for the compression plate, taken on the line 4—4 of Fig. 3.

Fig. 5 is a detail section of the valves, and;

Fig. 6 is a cross section of the intake pipe, taken on the line 6—6 of Fig. 1.

Vacuum is lost within vessels or containers due to the slow release of gas from the walls of the vessel or container. These gases are of two sources namely: absorbed gas and adsorbed gas.

As regards absorbed gas, the methods of manufacture of glass and many metals involve liquefaction, a process that results in the presence of large quantities of dissolved gases throughout the mass of the solidified material. These gases are prevented from escaping by the viscosity and surface tension of the liquid before solidification sets in.

Glass and metals also readily take up and hold gases in the form of an adsorbed surface-layer only a few molecules thick.

These absorbed and adsorbed gases are slowly given off in the cold by glass and metals when they are exposed to a vacuum.

There are several methods to liberate these gases from the walls, one of these methods is to electrically bombard the walls of the vessel being evacuated or the vacuating device, or both, or by exciting high frequency currents through the vessel or device by means of coils surrounding the vessel or device, or by heating the vessel or device with a gas flame, electric oven, or any other suitable form of heat.

Electrically bombarding means to pass a current of electricity along the walls of the device or vessel in either a continuous or intermittent flow. It also means to pass high frequency eddy current through the vessel or device, whether the material be glass or any other poor conductor of electricity, by placing coils around the object and then step the charge up by means of coils. Intermittent bombardment occurs, which will penetrate the nonconductor and liberate the gases which is termed gasing out of the glass or metal.

I am aware of various types of centrifugal, piston and mercury pumps used to create a vacuum but there are objections to these pumps due to either operating clearances which cause leakage or vapor which tend in time to destroy the vacuum and limit the degree of vacuum that can be obtained.

My invention contemplates the use of an expanding device operated in a rough vacuum under heat and electrical bombardment to free the gases, several such devices may be connected to produce a greater vacuum than is now obtainable.

Referring to the accompanying drawings; 11 indicates a cabinet provided with an upper wall 12 and a lower wall 13. A side wall 14 is of circular shape and is suitably secured to the top and bottom to form an air tight cabinet. A suitable vacuum pump is connected to the cabinet as instanced at 15, to maintain a rough vacuum within the cabinet to reduce the pressure on the expanding device 16. This device comprises a pair of corrugated plates 17 and 18 suitably secured together at their proximate edges. The corrugated plate 17 is secured to a disc 19. The disc 19 is secured to a compression plate 20 by means of screws 21.

A disc 22 (see Fig. 3) is secured to the bottom by means of screws 23. A gasket packing 24 is interposed between the disc 22 and the bottom wall to prevent leakage between the parts. Cushioning pads 25 are secured to the inner face of the bottom wall and the lower face of the disc 20, to aid in compressing the discs and causing the corrugations of one plate to snugly fit within the corrugations of the other plate. The closer the plates can be brought together the greater the displacement and consequent increased vacuum under a given stroke.

An operating shaft 26 is made integral with the disc 19 and extends upwardly through the top plate to a suitable operating mechanism. The upper wall is provided with an upwardly extending gland 27 arranged to receive a packing 28 which is held in place by means of a cap 29 having threaded connection with the gland 27. The inner face of the outer wall is provided with guide members 33 secured to the wall by means of bolts 34 received through slots 35 in the extending members. Extending plates 36 are secured to the plate 20 by means of bolts 37 received through slots 38 in the extending members and threaded into the plate 20. The extending members are provided with yokes 39 arranged to co-act with the guides 33. The guide members 33 and the extending members are adjustable to provide accurate alinement for the plate 20.

Rods 40 (see Fig. 3) are provided with ball ends 41 received in sockets 42 in the discs 19, 22 and are connected at their outer ends by means of a pivot pin 43. Retaining rings 44 are received about the rods 40 and are secured to the corrugated plates 17, 18. These rods are positioned at regular intervals about the expanding device 16 to support the plates and maintain an even pressure throughout the corrugated faces of the expanding member. The pads 25 are provided with slots 30 to receive the supporting rods when the device is compressed.

Intake and exhaust pipes 45, 46 are connected with the lower disc 22. The intake pipe 45 connects with the object 47 to be evacuated and the pipe 46 connects with another expanding device or may be open to atmosphere, or may connect with any other suitable pump. These pipes are provided with extensions 48, 49 in which valves 50, 51 are located. Caps 52, 53 close the extensions. These valves comprise ground taper faces 54 which co-act with seats 55 in the pipes.

I prefer to use a magnetic valve control for operating the valves although any other valve operating mechanism could be used without departing from the scope of the present invention. This valve operating mechanism comprises an operating rod 60 (see Fig. 3) adjustably secured to the operating shaft 26 by means of a set-screw 61. The lower end of the operating rod is provided with a hook 62 arranged to engage a gravity lever 63 which is pivoted at 64 to the supporting member 65 which is secured to the bottom wall 13 of the container by means of bolts 66.

The gravity lever 63 is provided with a weight extension 67 which is arranged above the pivot 64 to maintain the lever in either of its operating positions. The end of the lever 63 has a magnet 68 suitably held in a yoke 69 and insulated from the yoke by means of an insulating packing 70. Adjusting screws 71, 72 are received in extensions 73 of the supporting member and co-act with the outer end of the lever 63. These screws permit adjustment of the limits of the operation of the gravity lever.

A trip bar 74 is adjustably secured to the operating rod by means of a set-screw 75 and is provided with an extending arm 76 arranged to co-act with the outer end 77 of the gravity lever.

The magnet 68 encompasses the extensions 48, 49 and is of sufficient strength to lift the valves 50, 51 (see Fig. 5). In this way the valves can be operated under sealed conditions. Near the limit of the downward stroke of the device the tripping mechanism trips the valve for opening the valve 50 and closing the valve 51. The valves will remain in this position during the upward stroke of the device and will be tripped at the end of the stroke to close the valve 50 and open the valve 51 during the downward stroke of the device.

The intake pipe 45 is suitably connected to the vessel or container desired to be evacuated. The exhaust pipe 46 may connect with other devices similar to the device 16 for causing a series of vacuum pumps to operate in steps when it is desired to secure a very high vacuum from the object being evacuated.

The operation of the device consists in forcing down the corrugated plates 17, 18 whereby they will rest in close contact with each other. The object to be evacuated is electrically bombarded or heated to free the absorbed and the adsorbed gases which cling to the walls of the metal or glass. The expanding device is also electrically bombarded to free the gases therefrom and is also suitably heated which may be by means of electric heating pads suitably arranged about the discs but not shown in the accompanying drawings. The operating shaft 26 is then drawn upwardly causing an expansion between the corrugated plates 17, 18 which will withdraw the gases and air in the object being evacuated. Each of the expanding devices connected in line therewith will be similarly operated to withdraw the gas and air from each of the succeeding pumps. This operation can be repeated until the object being evacuated has reached the desired vacuum therein at which time the intake pipe 45 which is provided with an elongated opening 78 is pinched off and is then given another stroke under positive seal to prevent any possible leakage.

The means I have shown in the accompanying drawings to obtain a vacuum in an object has advantages over the present pumps now in use for the reason that leakage is reduced to an absolute minimum which can not be done in centrifugal or piston pumps which must have clearances in order to operate which necessarily would cause leakage and in pumps using a mercury, water or oil head there are the vapors of these gases which leak into the object being evacuated and tend to destroy the vacuum.

The method employed to produce a high vacuum consists of gasing out the object desired to be evacuated and then connecting in series a number of expanding devices which are also gassed out and heated to reduce internal friction in the metal. These expanding devices are preferably operated within a rough vacuum to reduce the pressure on the walls and permit lighter material to be used in the construction of the expanding device.

The cabinet around the expanding device is suitably constructed to withstand atmospheric or other pressures to which it may be exposed. Its chief duties are: to relieve pressure from the walls of the discs, to prevent possible collapse and to equalize the power required to operate the discs. The discs shown in the drawings are of very thin material and can be operated at comparatively high speed without creating sufficient internal friction within the discs to cause the metal to break. The metal disc is shown to emphasize the fact that the evacuator may be heated or electrically bombarded to assist in liberating the gases. The cushions are of suitable material to withstand the conditions to which they may be exposed. They aid materially in exhaling the discs to the limit by forcing the walls of the discs together. The rods are provided to add stiffness to the discs cross sectional to the corrugations. The pivot or hinge at the intersection of the rods acts to centralize the rim of the discs throughout the stroke.

The whole device may be electrically bombarded or the discs may be insulated from the cabinet and bombarded alone. Any suitable means may be employed to apply the heat to the discs. It may be applied externally to the whole machine, circulated through the containing vessel or applied internally, electrically or otherwise. The operating attachments for the magnet are provided with ample timing adjustments for various speeds and conditions.

While the device shown comprises thin metal discs, I do not limit my invention to the form shown as it is obvious that the expanding device may be made in various forms and of various materials, whereby the action of the device will alter the form thereof and increase the cubical capacity under positive seal.

I have shown a cabinet about the expanding device but other forms employng this principle may be constructed to withstand high pressure on the exterior, or may be submerged in liquid to either assist in exhaling or to provide vapor through any minute openings that may exist in the material and the vapor may be collected by a suitable vapor trap. The device may be employed in combination with any other suitable form of pump, or a series of these devices may be employed together.

Having thus fully described my invention what I claim as new and desire to secure by Letters Patent is:

1. A vacuum producing device comprising an evacuated container, a metallic expanding device in said container, means for compressing and expanding said device and guides on said container for guiding said expanding device and causing said device to compress and expand uniformly, and valves magnetically operated for controlling the flow of gas through said expanding device.

2. A vacuum producing device comprising an evacuated container, a metallic expanding device in said container, comprising a pair of corrugated discs, means for compressing and expanding said discs, and hinged arms connecting said discs for maintaining said discs in uniform relation to each other, and valves magnetically operated for controlling the flow of gas through said expanding device.

3. A vacuum producing device comprising an evacuated container, a metallic expanding device in said container comprising a pair of corrugated discs, means for compressing and expanding said discs, hinged arms connecting said discs for maintaining said discs in uniform relation to each other and connections between said discs and the object to be evacuated, and means magnetically operated for controlling the flow of gas to and from said expanding device.

4. The combination in a vacuum producing device, of an evacuated container, a pair of corrugated metallic discs forming a pump in said container, one of which is attached to a stationary portion of the containing device and the other attached to an actuating shaft, tubular connections to said pump provided with magnetically operated valves for controlling the flow of liquid to and from said pump.

5. In a vacuum producing device, the combination of a metallic bellows, ground seated core valves, said cores being composed of a magnetic material, said valves controlling the passage of air and gas to and from said bellows, said valve cores being operated by the influence of said magnet applied to the exterior of said valves controlled by the movements of said bellows.

6. The combination in a vacuum producing device of a metallic bellows and magnetically operated valves controlling the passage of gas to and from said bellows, said valves operated by said bellows.

7. The combination in a vacuum pump of a metallic bellows, valves having cores magnetically operated and movable from the free path of the gases entering or leaving said bellows, said valves operated by said bellows.

8. The combination in a vacuum producing device having a metallic bellows to form a pump, of a pair of tubes communicating with said pump, valves in said respective tubes and a magnet arranged about said tubes for operating said valves and means for automatically actuating said magnet controlled by the action of said bellows.

BONNIE G. JONES.